United States Patent [19]

van Dongeren

[11] 4,280,534

[45] Jul. 28, 1981

[54] PLASTICS PIPES HAVING WALLS WITH LENGTHWISE EXTENDING CHANNELS

[75] Inventor: Jan P. van Dongeren, Bergentheim, Netherlands

[73] Assignee: Wavin B.V., Zwolle, Netherlands

[21] Appl. No.: 904,218

[22] Filed: May 9, 1978

Related U.S. Application Data

[63] Continuation of Ser. No. 728,117, Sep. 30, 1976, abandoned.

[30] Foreign Application Priority Data

Oct. 3, 1975 [NL] Netherlands ......................... 7511693

[51] Int. Cl.³ ........................... F16L 9/12; F16L 9/18
[52] U.S. Cl. ................................... 138/109; 138/148; 138/172; 138/115
[58] Field of Search ............... 138/109, 111, 115, 148, 138/150, 172, 155; 285/31, 284, 286, 344, 423, DIG. 16; 220/68; 264/322

[56] References Cited

U.S. PATENT DOCUMENTS

| 627,293 | 6/1899 | Brighton | 138/109 X |
|---|---|---|---|
| 1,266,831 | 5/1918 | Layne | 138/172 |
| 1,677,714 | 7/1928 | Frease | 138/172 X |
| 3,087,513 | 4/1963 | O'Rourke | 138/109 |
| 3,120,570 | 2/1964 | Kennedy et al. | 138/149 X |
| 3,167,204 | 1/1965 | Rouse | 138/148 X |
| 3,217,077 | 11/1965 | Cocke | 138/109 X |
| 3,379,221 | 4/1968 | Harry et al. | 138/172 X |
| 3,464,450 | 9/1969 | Steffenini | 138/172 X |
| 3,665,967 | 5/1972 | Kachnik | 138/178 X |
| 3,747,632 | 7/1973 | Kok et al. | 138/109 X |
| 3,920,268 | 11/1975 | Stewing | 138/155 X |
| 4,014,369 | 3/1977 | Kobres | 138/148 X |

FOREIGN PATENT DOCUMENTS

| 269908 | 5/1913 | Fed. Rep. of Germany | 138/148 |
|---|---|---|---|
| 1107466 | 5/1961 | Fed. Rep. of Germany | 138/148 |
| 1166668 | 11/1958 | France | 138/148 |

Primary Examiner—James E. Bryant, III
Attorney, Agent, or Firm—Wigman & Cohen

[57] ABSTRACT

Plastics pipes comprising an inner and outer wall being interconnected by lengthwise extending connecting partitions, forming channels, the ends of the channels being each separately sealed by sealingly pressing the end walls of a channel to each other after these walls have been heated to a temperature surpassing the plasticizing temperature.

2 Claims, 9 Drawing Figures

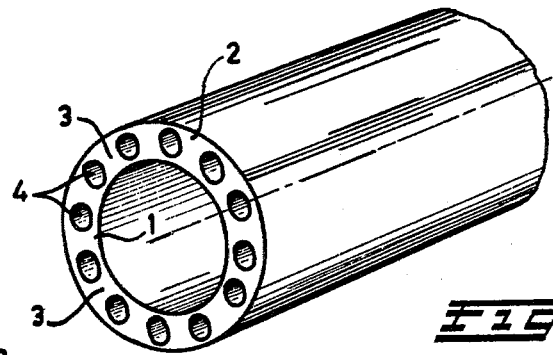
Fig: 1.
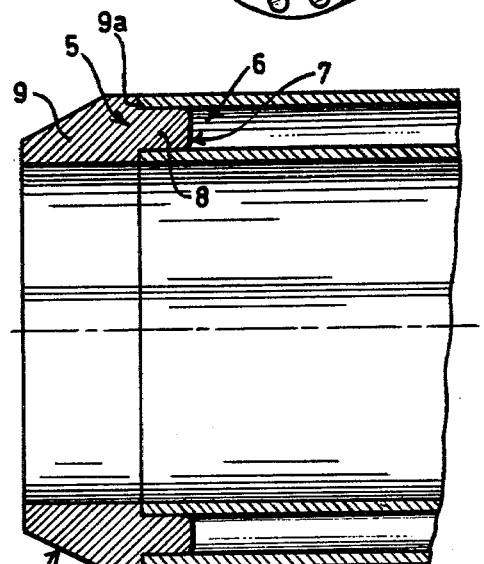
Fig: 2.
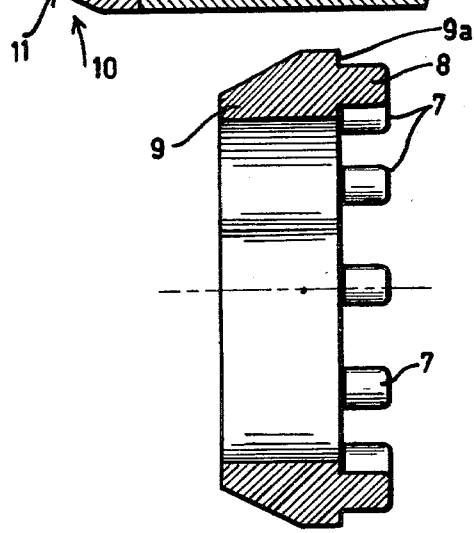
Fig: 3.

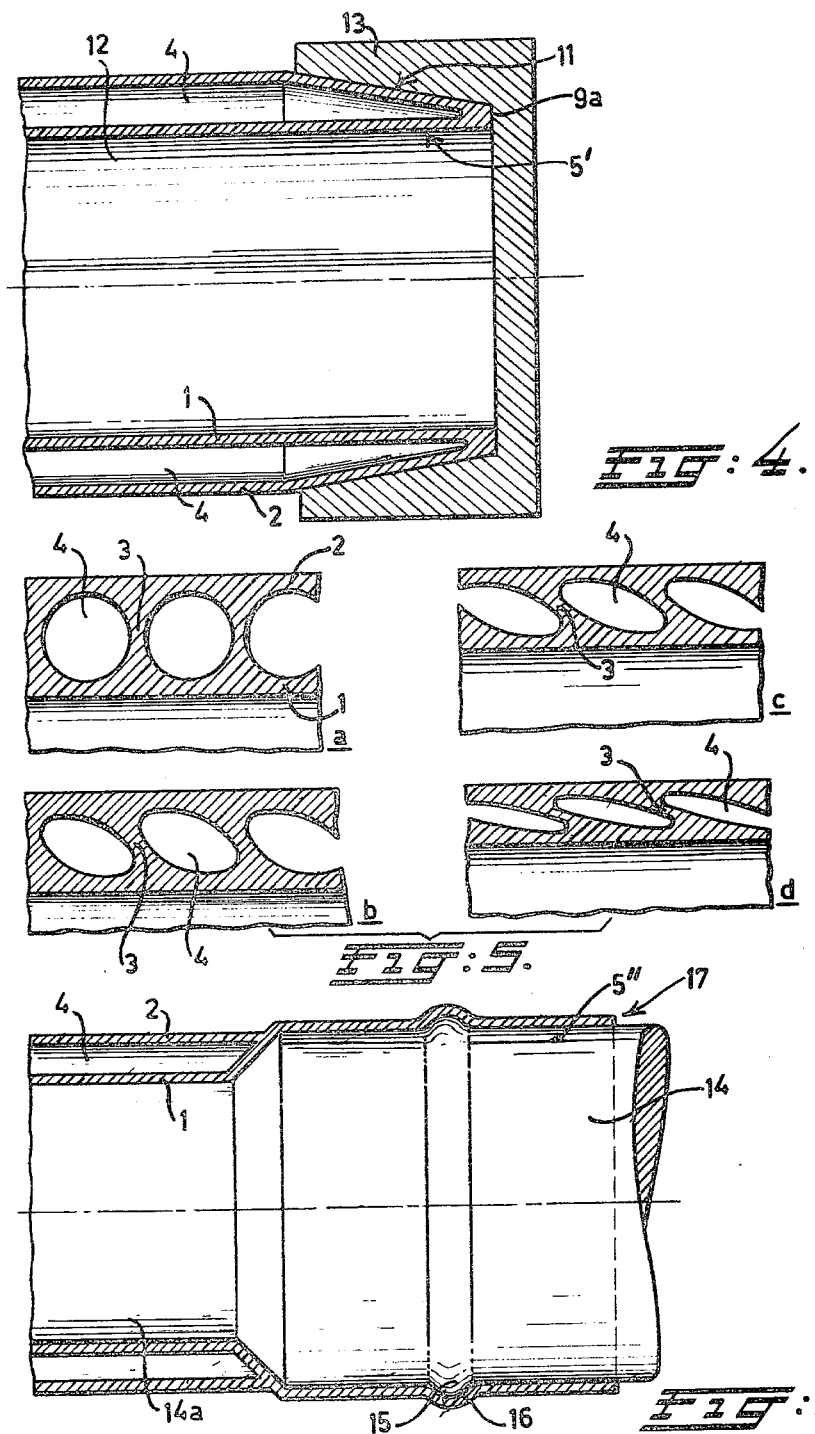

PLASTICS PIPES HAVING WALLS WITH LENGTHWISE EXTENDING CHANNELS

This is a continuation of application Ser. No. 728,117, filed Sept. 30, 1976 now abandoned.

BACKGROUND OF THE INVENTION

This invention relates to plastics pipes comprising an inner wall and an outer wall which are interconnected by lengthwise extending connecting partitions forming lengthwise extending channels.

Such plastics pipes with lengthwise extending channels which are delimited by an inner and an outer wall are known per se.

When in use in pipe, the outer wall may be damaged so that ground water can penetrate through openings or cracks in the said outer wall into the lengthwise extending channels. This groundwater then happens to mix with waste liquids transmitted by the aforementioned pipe lines.

Plants for sewage purification which purify the sewage water supplied by the pipe lines can thus be loaded with large quantities of groundwater which need not be purified.

In case of damage or openings in the outer wall, waste water from the pipe lines may also flow into the continuous channels and, via these continuous channels and openings or cracks in the outer wall, issue, which gives rise to serious pollution of the soil.

SUMMARY OF THE INVENTION

The present invention provides a plastics pipe of the aforementioned type which is not subject to the above-mentioned disadvantages.

Each channel is provided with a channel closing wall which ends at some distance from the nearest free end of the pipe, from which follows that each channel is individually closed, which solution prevents that liquid issues from the pipe line or enters a pipe line, when the outer wall is damaged. This can never be achieved by using a cap, since in case of damage to such a cap the channels would also be open to passing liquid.

Each channel closing wall is efficiently part of a projection mounted on a ring, which ring extends to beyond the aforementioned free end of the plastics pipe. For the purpose of introducing such a pipe into a socket one end part of this ring is conveniently beveled.

The channel closing wall consists of a plastics wall integral with the pipe, obtained by pressing the channel walls against each other at the end of a channel.

As the channel closing wall is integral with the pipe body, leakage of liquids through the lengthwise extending channels is entirely eliminated.

The pipe is efficiently provided with a socket end whether with a groove for accommodating a sealing member or not.

The invention relates in an-other aspect to a method for manufacturing a plastics pipe comprising an inner wall and outer wall being connected by lengthwise extending connecting partitions forming lengthwise extending channels. At the ends of a channel its walls, after been heated to above the plasticizing temperature, are pressed sealing-ly against each other, which operation provides a plastics pipe having efficiently sealed longitudinal channels.

When pressing the walls of a channel against each other, after heating to above the plasticizing temperature, the end of the pipe is subjected to a rotary motion, which is convenient in that, when the channels are closed, the risk of creases is entirely avoided.

In order to subject the pipe to a rotary motion it is slid, after its end has been heated, to a mandril, whereupon a flange is arranged from outside which conically tapers toward the end of the pipe. Simultaneously a small rotation is imparted to the flange.

Due to this small rotation the cross sections of the continuous channels gradually deform until the walls of a channel adjoin each other entirely.

When the channels are sealed by heating the plastics material to above the plasticizing temperature and pressing the channel walls to each other, the pipe can advantageously be provided with an end socket by widening the former.

BRIEF DESCRIPTION OF THE DRAWINGS

FIG. 1 is a perspective view of a known plastics pipe with lengthwise extending non-sealed channels;

FIG. 2 is a cross section of a first embodiment of a pipe according to the invention having sealed channels by means of channel closing walls;

FIG. 3 is a cross section through a sealing in a pipe of FIG. 2, in order to obtain channel closing walls in each of the channels;

FIG. 4 is another embodiment of a plastics pipe according to the invention with sealed ends of the lengthwise extending channels;

FIG. 5a to 5d show some details of the cross sectional shape of the channel openings of a pipe according to the invention when a conical rotating closing ring is used, and FIG. 6 is a pipe according to the invention having a socket with inner groove.

DESCRIPTION OF PREFERRED EMBODIMENTS

The perspective view in FIG. 1 shows a known plastics pipe comprising an inner wall 1 and an outer wall 2 being interconnected by lengthwise extending connecting partitions 3 while forming lengthwise extending channels 4. Although in this embodiment the axis of the longitudinally extending channels is parallel to the axis of the plastics pipe this is not necessarily so, as the connecting partitions may be provided such that slightly spirally extending longitudinal channels are produced.

Plastics pipes of this type are known and can be used for conveying waste liquids, particularly in sewage disposal pipe lines. However, they present the disadvantage that liquid with components suspended therein flows through the channels themselves. The latter construction is rather inconvenient when e.g. the outer wall of such a pipe is more or less damaged, while the inner wall of the plastics pipe is not damaged.

Such a situation may easily arise since these known pipes are particularly manufactured in order to decrease the consumption of plastics material in the pipes, especially by forming a thin inner wall 1 and a thin outer wall 2.

When for instance the outer wall 2 is more or less damaged, liquid can easily penetrate through the lengthwise extending channels 4 into the pipe lines. The purification plants then have to purify more sewage water than the pipelines normally transmit. Groundwater namely, can flow into a pipe line through channels 4, when they are open and mix there with sewage water.

Water purification consumes already much energy, which consumption increases importantly when the liquid to be purified contains groundwater.

In cases of damage to the outer wall 2 when the lengthwise extending channels 4 are open, a second possibility is that liquids issue from the pipe line through the channels 4 and openings in the outer wall, which may cause serious soil pollution.

So as to alleviate all the aforementioned difficulties, each channel has at its end 5 a channel closing wall 6, according to the present invention.

FIGS. 2 and 3 show a first embodiment of a plastics pipe according to the invention, that is to say a plastics pipe with a channel closing wall 6. This channel closing wall 6 is an end wall 7 of a cylindrical projection 8 arranged on a ring 9. The cylindrical projections are situated at the ends 5 of the channels 4 and extend for a small part of their length, for example 1 or 2 cm, in the channels, from their free ends 9a which are nearest to the end wall 7.

In order to obtain a proper sealing, the cylindrical projections 8 may be provided with a sealing glue coat, but they can also be fused with the inner wall of a lengthwise extending channel having a cylindrical cross section.

Ring 9 has a chamfered edge 11 on its front side 10 so that the pipe can more easily be used in a spigot and socket joint.

It is also possible to widen the part of the ring 9, situated outside the channels 4, so as to form a socket and to provide the latter with an inner groove for receiving sealing means. When the ends shown in FIG. 2, having a chamfer, and such a socket are combined, then such pipes can be sealingly interconnected, whereby any risk of liquid passing through the channels is eliminated.

The ring 9 with the cylindrical projections consists of the same plastics material as that of the pipes with lengthwise extending channels.

FIG. 4 shows another embodiment of a plastics pipe wherein at the ends 5' of a channel the walls of a channel are sealingly pressed against each other after having been heated above the plasticizing temperature.

In order to carry out such an operation an end 5' of a plastics pipe with lengthwise extending channels between an inner and an outer wall is heated and thereupon slid over a mandril 12 after which a flange 13, conically tapering toward the end zone of the pipe, is slid over the outside of the pipe, so that the walls of the channels 4 are pressed together and the desired sealing is obtained.

In order to prevent the formation of creases during this operation a small rotation is imparted to the flange 13 when sliding same over the end of the plastics pipe. This rotation is taken over by the free part 9a causing the partitions 3 to be gradually deformed. The cross sections of the channels 4 initially change over into an elliptic shape, gradually becoming more elliptic; finally the walls completely contact each other and fuse owing to the temperature of the plastics material, while forming a sealing. Due to the conical shape of the flange 13 a pipe with a beveled edge 11 is produced.

FIGS. 5a to 5d show some details of the cross sectional shape of the channel opening of a pipe according to the present invention when the conical rotating flange is acting thereon.

Obviously the channels are entirely confined in the proximity of the end zone 5' of the pipe due to the rotary motion, whereas the cross section of the channels as seen from said end 5' gradually increases.

Such a pipe with sealed end zones of the channels 4 has appeared to be very convenient in practice.

FIG. 6 shows a slightly different embodiment having an end zone 5'' widened by means of a widening pin 14 with an annular elevation 15 by which a groove 16 is produced.

When the socket 17 is formed a small rotation is imparted to the widening pin 14 in order to avoid the formation of creases in the plastics pipe.

In order to maintain the inside diameter of the pipe in the part which is not to be widened, the widening pin 14 has a part 14a, the diameter of which corresponds to the inside diameter of the original plastics pipe.

The method described hereinbefore for sealing longitudinally extending channels by means of a ring 9 with cylindrical projections 8 lends itself well for sealing channels at a building site where sawed off pipe parts are used which likewise should be provided with a sealing in each of the longitudinally extending channels.

The operation of sealing the longitudinally extending channels by means of a mandril 12 and a flange 13 is more suitable when effected in factories.

What I claim is:

1. A plastic pipe comprising:
an inner wall and an outer wall, said walls being interconnected by connecting partitions forming substantially rounded channels extending substantially entirely lengthwise of said pipe, at least one end of said pipe having a conical channel closing wall formed by a diverging straight-line conical portion of said inner wall directed toward and integrally formed with the outer wall adjacent said pipe end and generally cylindrical socket means, being integrally formed with said walls and extending for a distance beyond said pipe end, for receiving internally therein a mating end of another pipe, said inner and outer walls, and said partitions all being integrally formed together in one piece from plastic material.

2. The plastic pipe according to claim 1, wherein said socket means includes an interior annular groove for receiving a sealing member.

* * * * *